US011283163B2

(12) United States Patent
Thoday et al.

(10) Patent No.: US 11,283,163 B2
(45) Date of Patent: Mar. 22, 2022

(54) ANTENNA HOUSING, A COMBINED ANTENNA AND INDICATOR MODULE AND A VEHICLE

(71) Applicant: MOTHERSON INNOVATIONS COMPANY LTD., London (GB)

(72) Inventors: Sam Thoday, Lonsdale SA (AU); Shane Randell Koehne, Lonsdale SA (AU); Gary Dekievit, Lonsdale SA (AU); James Nicholson, Lonsdale SA (AU); Scott Edwards, Lonsdale SA (AU); Simon Belcher, Lonsdale SA (AU); Jacob Heath Messenger, Lonsdale SA (AU); Simon David Field, Lonsdale SA (AU); Dean Caruso, Lonsdale SA (AU); Bill Frank, Lonsdale SA (AU); Mathew Chapman-Winter, Lonsdale SA (AU); Raimund Negel, Stuttgart (DE); Arne Schmierer, Stuttgart (DE); Daniel Fritz, Stuttgart (DE); Andreas Herrmann, Stuttgart (DE)

(73) Assignee: Motherson Innovations Company Ltd., London (GB)

(*) Notice: Subject to any disclaimer, the term of this patent is extended or adjusted under 35 U.S.C. 154(b) by 0 days.

(21) Appl. No.: 16/824,048

(22) Filed: Mar. 19, 2020

(65) Prior Publication Data

US 2020/0287278 A1    Sep. 10, 2020

Related U.S. Application Data

(63) Continuation-in-part of application No. PCT/EP2018/074460, filed on Sep. 11, 2018.

(30) Foreign Application Priority Data

Sep. 20, 2017    (AU) .................... 2017903825

(51) Int. Cl.
*H01Q 1/42*     (2006.01)
*B60Q 1/00*     (2006.01)
(Continued)

(52) U.S. Cl.
CPC ............. *H01Q 1/42* (2013.01); *B60Q 1/0023* (2013.01); *B60R 11/04* (2013.01);
(Continued)

(58) Field of Classification Search
CPC ...... B60Q 1/0017; B60Q 1/0023; B60Q 1/26; B60Q 1/2611; H01Q 1/2241; H01Q 1/32; H01Q 1/3275; H01Q 1/42; H01Q 1/44
See application file for complete search history.

(56) References Cited

U.S. PATENT DOCUMENTS

| 9,628,170 B1* | 4/2017 | Rosenband .......... H04B 7/0805 |
| 2006/0152941 A1* | 7/2006 | Chiang .................... H01Q 1/44 362/540 |

(Continued)

FOREIGN PATENT DOCUMENTS

| DE | 102011016400 A1 | 10/2012 |
| EP | 1598237 A1 | 11/2005 |

(Continued)

OTHER PUBLICATIONS

International Search Report dated Nov. 7, 2018 of International application No. PCT/EP/2018/074460.
Written Opinion dated Nov. 7, 2018 of International application No. PCT/EP/2018/074460.

*Primary Examiner* — Jason Crawford
(74) *Attorney, Agent, or Firm* — Jones Day

(57) ABSTRACT

An antenna housing for mounting on a vehicle or on a vehicle roof surface includes an electrical circuit including at least one source element for emitting luminescent radiation, the at least one source element being located internally within the housing so as not to be visible externally, an
(Continued)

indicating element for releasing luminescent radiation received from the at least one source element for viewing externally, and an optical conduit for providing an optical couple between the at least one source element and the indicating element. A combined antenna and indicator module for mounting on a vehicle includes the antenna housing, and a vehicle includes the combined antenna and indicator module.

56 Claims, 10 Drawing Sheets

(51) Int. Cl.
  *H01Q 1/44* (2006.01)
  *B60R 11/04* (2006.01)
  *B60R 16/023* (2006.01)
  *H01Q 1/32* (2006.01)
(52) U.S. Cl.
  CPC ....... *B60R 16/0231* (2013.01); *H01Q 1/3275* (2013.01); *H01Q 1/44* (2013.01)

(56) References Cited

U.S. PATENT DOCUMENTS

| | | | |
|---|---|---|---|
| 2012/0242466 A1* | 9/2012 | Stillfried | B60Q 1/50 340/425.5 |
| 2012/0306634 A1* | 12/2012 | Tsuda | B60W 30/143 340/425.5 |
| 2015/0224962 A1* | 8/2015 | Walzik | B60R 25/1003 340/426.1 |
| 2015/0280316 A1* | 10/2015 | Iso | H01Q 1/3275 343/713 |
| 2016/0082880 A1* | 3/2016 | Co | B60Q 1/2611 701/2 |
| 2017/0229767 A1* | 8/2017 | Suffolk | H01Q 21/28 |
| 2018/0076512 A1* | 3/2018 | Chen | H05B 47/19 |
| 2018/0076514 A1* | 3/2018 | Nugent | H01Q 1/1214 |

FOREIGN PATENT DOCUMENTS

| | | | |
|---|---|---|---|
| JP | 2016116047 | * | 6/2016 |
| WO | WO 2016/093082 A1 | | 6/2016 |
| WO | WO 2018/043011 A1 | | 3/2018 |

* cited by examiner

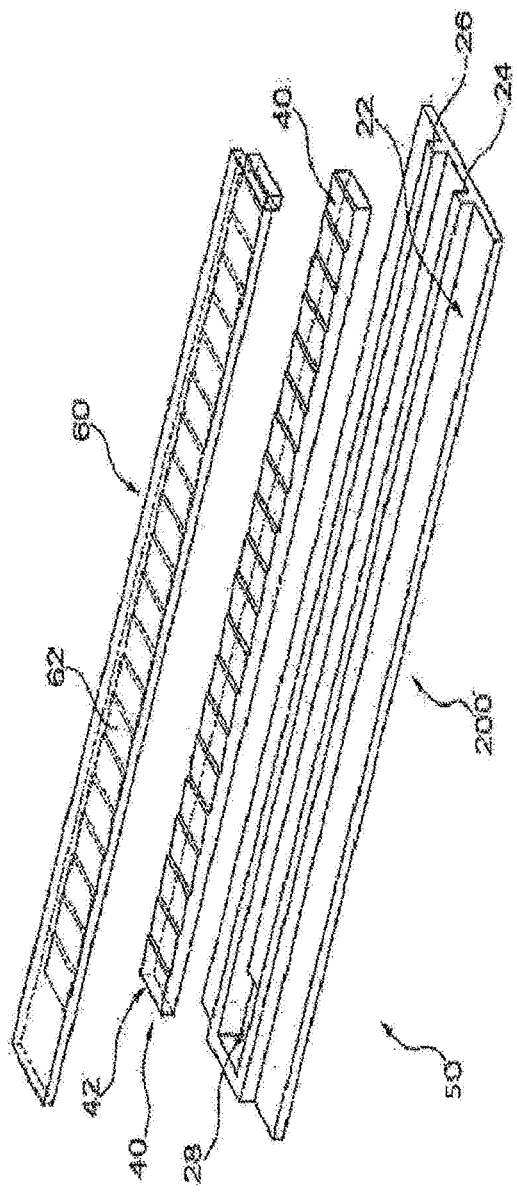
FIG. 12
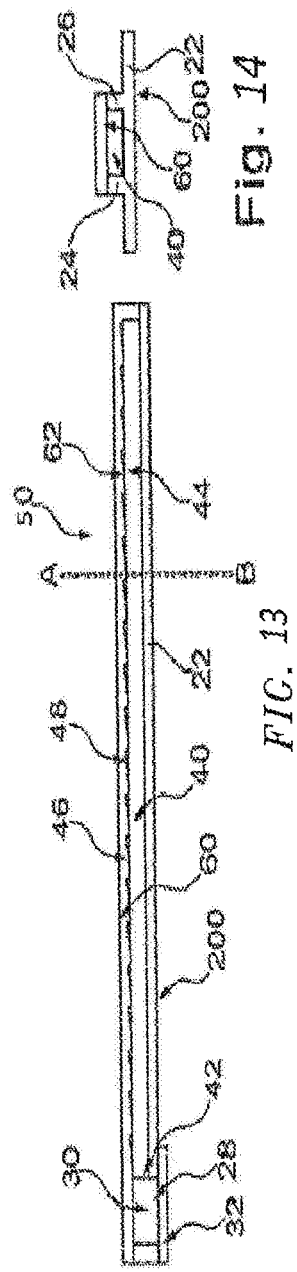
FIG. 13
FIG. 14

ANTENNA HOUSING, A COMBINED ANTENNA AND INDICATOR MODULE AND A VEHICLE

CROSS-REFERENCE TO RELATED APPLICATIONS

This application is a continuation-in-part of International Patent Application No. PCT/EP2018/074460, filed Sep. 11, 2018, which claims the benefit of foreign priority to Australian Patent Application No. 2017903825, filed Sep. 20, 2017, each of which is herein incorporated by reference in its entirety for all purposes.

BACKGROUND

1. Field of the Invention

The present disclosure relates to an antenna housing, a combined antenna and indicator module, and a vehicle.

2. Related Art

Modern vehicles require a plurality of antenna elements for receiving and transmitting radio transmissions such as AM/FM radio, WiFi, cellular, remote keyless entry, GPS, Bluetooth, etc. A known solution to this requirement is in the form of a multiband roof mounted "shark fin" antenna module, having a plurality of antenna elements and associated electrical circuitry disposed beneath a shark fin-shaped outer cover.

In some applications, it may also be desirable to incorporate a lighting system as part of the module to provide information to viewers exterior to the vehicle. An aesthetic feature which is becoming more desirable is achieving an even (uniform or homogenous) area luminance with a light emitting diode (LED) input. An LED is a directional light source having a relative luminous intensity that decreases as the viewing angle is increased. This may result in the appearance of bright or hot spots to an external viewer of the lighting system.

Additionally, the presence of a lighting system and associated electrical circuitry within close proximity of the antenna can degrade characteristics of the antenna by blocking radio waves and/or through electromagnetic interference (EMI).

SUMMARY

According to a first aspect, there is provided an antenna housing for mounting on a vehicle, in particular on a vehicle roof surface, and being adapted to house an electrical circuit including at least one source element for emitting luminescent radiation, the at least one source element being located internally within the housing so as not to be visible externally, an indicating element for releasing luminescent radiation received from the at least one source element for viewing externally, and an optical conduit for providing an optical couple between the at least one source element and the indicating element.

In one form, the antenna housing further comprises an electrical circuit receiving recess configured to receive or support the electrical circuit.

In one form, the antenna housing further comprises a vehicle roof surface engaging portion, in particular disposed around the electrical circuit receiving recess.

In one form, the antenna housing is mounted on a vehicle roof surface such that the recess projects into a corresponding recess or aperture within the vehicle roof surface.

In one form, the housing includes a window for releasing luminescent radiation with the window preferably being positioned adjacent to the indicator element.

In one form, the window allows light transmission of between 5-75% preferably between 10-75%.

In one form, the housing comprises an opaque inner layer and a tinted outer layer, with the opaque inner layer preferably including the window.

In one form, the indicating element and the optical conduit form part of a light guide, the light guide preferably having a unitary body.

In one form, the optical conduit has a plurality of legs, preferably each of the legs being associated with one source element.

In one form, the housing, the source element, the indicating element, the optical conduit, the window, the legs and/or the light guide form at least partly at least one lamp unit, wherein preferably the source element forms at least partly ate least one light source and/or the indicating element, the optical conduit, the legs and/or the light guide form at least partly at least one light pipe.

In one form, at least one a clear lens especially partly formed by the window, encloses at least partly and/or substantially the housing, the at least one light pipe, especially the indicating element, the optical conduit, the legs and/or the light guide, and/or the at least one light source, the lens having an inner surface, an outer surface disposed opposite the inner surface and a continuous transparent and/or translucent coating on the outer surface, wherein when the at least one light source emits light, the continuous transparent and/or translucent coating is at least partially permeable to at least some light which is emitted by the at least one light source and passed through the lens, wherein the at least one light pipe is provided with an inside coating and/or an outside coating and/or faded marks.

In one form, the coating is located on selective locations of the light pipe, optionally in different thicknesses.

In one form, the coating is a hardcoating selected from the group of an organo-silicon, an acrylic, a urethane, melamine and a $SiO_xC_yH_z$.

In one form, the coating has a different refractive index compared to the refractive index of the material of the light pipe, the indicating element, the optical conduit, the legs and/or the light guide.

In one form, the faded marks are selected from the group consisting of etches, tints, dyings, additives, reflecting materials, scattering materials or optics moulded into the light pipe.

In one form, the faded marks are introduced into the at least one light pipe by choosing at least one additive for the respective plastic.

In one form, the light pipe, the indicating element, the optical conduit, the legs and/or the light guide is/are coated at selective locations.

In one form, the lamp unit is produced out of plastic in a 3-component injection procedure, wherein the refractive index of the plastic of the clear lens is selected to be different from the refractive index of the plastic of the light pipe, the indicating element, the optical conduit, the legs and/or the light guide, the boundary between the clear lens and the at least one light pipe, the indicating element, the optical conduit, the legs and/or the light guide, adjacent to it is at least partly formed with a structure.

In one form, the housing further comprises at least one light foil.

In one form, the light foil is arranged at least partly between the clear lens and at least a part of the at least one light pipe, the indicating element, the optical conduit, the legs and/or the light guide.

In one form, the light foil is extending along at least a part of the clear lens.

In one form, the light pipe, the indicating element, the optical conduit, the legs and/or the light guide is/are is enclosed by the housing and the clear lens.

In one form, the light rays from at least one first light source are subjected to a total reflection at the boundary between the light pipe, the indicating element, the optical conduit, the legs and/or the light guide on the one hand and the clear lens on the other side outside at least one light decoupling area.

In one form, the light rays from a second light source are decoupled along at least a part of the extent of the light pipe, the indicating element, the optical conduit, the legs and/or the light guide.

In one form, the light rays decoupled from the light pipe, the indicating element, the optical conduit, the legs and/or the light guide pass at least one of the light foil, the clear lens and the housing.

In one form, the light rays decoupled from the light pipe the indicating element, the optical conduit, the legs and/or the light guide pass an opening in at least one of the light foil and the housing.

In one form, there is a plurality of light decoupling regions provided by at least one of the clear lens and the housing.

In one form, there is a plurality of at least one of light decoupling directions and light decoupling ranges.

In one form, there is a plurality of light decoupling regions, with light having different characteristics are decoupled from the different decoupling regions.

In one form, the clear lens is made out of a polymeric substrate, wherein the polymeric substrate is coated with a chromium-based reflective coating and wherein the polymeric substrate and the chromium-based reflective coating are at least in part permeable to light originating from at least one of the light foil and the at least one light source.

In one form, the coating is an alloy of chromium and a dopant material, the dopant material being selected from the hexagonally close-packed transition metals, the alloy having a crystal structure of a primary body-centered cubic phase in coexistence with a secondary omega hexagonally close-packed phase.

In one form, the alloy is a binary alloy of chromium and the dopant material.

In one form, the atomic percentage of the dopant material in the binary alloy is in the range of from about 1.9 at. % to about 5.8 at. %.

In one form, the atomic percentage of the dopant material in the binary alloy is in the range of from about 1.9 at. % to about 5.8 at. %.

In one form, the dopant material is selected from the hexagonally close-packed transition metals zirconium, titanium, cobalt, hafnium, rubidium, yttrium and osmium.

In one form, the dopant material is selected from the hexagonally close-packed transition metals zirconium, titanium and cobalt.

In one form, the dopant material is selected from the hexagonally close-packed transition metals zirconium, titanium and cobalt.

In one form, the alloy is a binary alloy and the dopant material is zirconium, and wherein the atomic percentage of the zirconium in the binary alloy is in the range of from about 4.5 at. % to about 5.8 at. %.

In one form, the alloy is a binary alloy and the dopant material is titanium, and wherein the atomic percentage of the titanium in the binary alloy is in the range of from about 1.9 at. % to about 5.8 at. %.

In one form, the alloy is a binary alloy and the dopant material is cobalt, and wherein the atomic percentage of the cobalt in the binary alloy is in the range of from about 1.9 at. % to 5.7 at. %.

In one form, the coating has a thickness of 200 nm, or 100 nm or in the range of from 40 nm to 80 nm, or. in the range of from 50 nm to 70 nm, or about 60 nm.

In one form, the polymeric substrate is formed from a material selected from the group of polyacrylate, polyester, polystyrene, polyethylene, polypropylene, polyamides, polyamides, polycarbonate, epoxy, phenolic, acrylonitrile-butadiene-styrene, acrylonitrile-styrene-acrylates, acetal and blends of these.

In one form, the polymeric substrate is formed from a material selected from the group of polycarbonate, poly(2, 2'-dihydroxyphenylpropane) carbonate, polydiethylenegly-col bis(allyl carbonate), polymethylmethacrylate and polystyrene, or blends thereof.

In one form, the polymeric substrate includes a pre-coated film in the form of either a hardcoat, an inorganic oxide, or a thin metal film, or a combination of such pre-coated films.

In one form, two or more light pipes are present at the same location wherein at least one light pipe can be seen from the outside and wherein one or more of the other light pipes is coated with a chromium-based reflective coating.

In one form, the light source and the light foil fulfill different light functions, especially at least one of a turn light indicator, a puddle light, a logo light and an approach light.

In one form, there are at least two source elements and/or light sources fulfilling different light functions, especially at least one of a turn light indicator, a puddle light, a logo light and an approach light.

According to a second aspect, there is provided a combined antenna and indicator module for mounting on a vehicle, in particular on a vehicle roof surface, including the antenna housing as described above and at least one antenna element or antenna module supported by or within the housing.

In one form, the electrical circuit is shielded to prevent or reduce electromagnetic interference with the, or each, antenna element or module, with preferably the optical conduit and/or the light guide being positioned adjacent the antenna element or antenna module.

In one form, the, or, each antenna element has a projected pattern for receiving or transmitting radio transmissions.

In one form, at last part of the indicating element and/or at least part of the optical conduit is/are positioned within the projected pattern of the, or each, antenna element.

In one form, the electrical circuit is positioned outside of the projected pattern of the, or each, antenna element.

In one form, the combined antenna and indicator module comprises a lighting module, which comprises a cover element through which protrudes the light emitting surface and the electrical circuit.

In one form, the indicating element features discrete optics, in particular in the form of a plurality of angled surfaces, which direct light toward the light emitting surface.

In one form, the combined antenna and indicator module comprises at least one reflector element, with preferably a first reflector element being positioned at a bend in the light guide and/or a second reflector element being positioned under the indicating element, in particular under the optics of the indicating element.

In one form, the module further comprises at least one control unit connected to the light source, the light foil and/or the vehicle.

In one form, the module comprises at least one camera.

In one form, the camera is arranged within the antenna housing.

According to a third aspect, there is provided a vehicle with at least one combined antenna and indicator module as described above, preferably attached or attachable to a roof surface of the vehicle.

BRIEF DESCRIPTION OF DRAWINGS

Embodiments of the present invention will be discussed with reference to the accompanying drawings wherein:

FIG. 6b is a detail view of a portion of the light guide of FIG. 6a;

FIG. 7 is a partial longitudinal cross-sectional view of the indicator module of FIG. 2a;

FIG. 8 is a lateral cross-sectional view of the indicator module of FIG. 2a;

FIG. 12 is a diagram illustrating a housing, a light pipe and a clear lens of a lamp unit;

FIG. 13 is a diagram illustrating the light from FIG. 12 as a unit in longitudinal section;

FIG. 14 is a diagram illustrating a cross-sectional view along the line A-B in FIG. 13;

DESCRIPTION OF EMBODIMENTS

Figure 1:
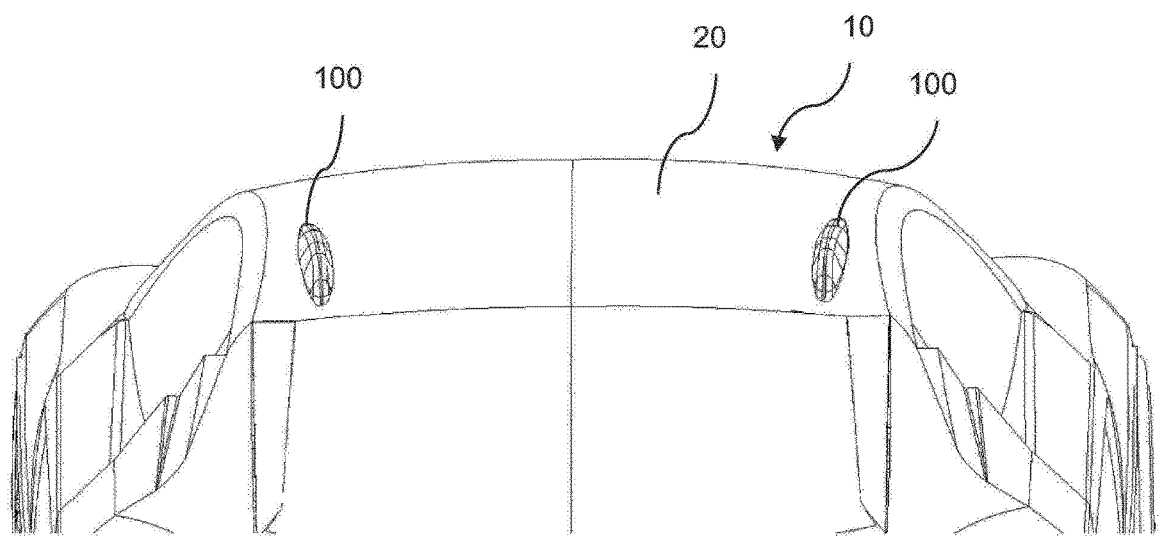
FIG. 1 is a partial rear perspective view of a vehicle with two indicator modules mounted to its roof.

For ease of understanding, the description and drawings present an embodiment of the invention comprising a combined antenna and indicator module, including an antenna housing and at least one antenna element supported by or within the housing.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

This forming of a lamp unit allows for an improved control of light efficiency within the at least one light pipe, i.e. substantially no light is lost from the system.

It is proposed that the at least one light pipe, the indicating element, the optical conduit, the legs and/or the light guide is/re substantially transparent and without any visible discrete optic features in an un-lit state, while being diffusive in a lit state. But the light pipe annulus can also be substantially transparent and non-diffusive in both a lit and un-lit state, while the circumferential flanges or cylinders are substantially transparent in an un-lit state, while being diffusive in a lit state.

The at least one light pipe, the indicating element, the optical conduit, the legs and/or the light guide may comprise a clear polymeric material. The clear polymeric material may be selected from the group consisting of polyacrylate, such as poly(methyl methacrylate) (PMMA), polyester, polystyrene, polyethylene, polypropylene, polyamides, polyamides, polycarbonate, epoxy, phenolic, acrylonitrile-butadiene-styrene, acrylonitrile-styrene-acrylates, acetal and blends of these. Preferred substrate materials include polycarbonate, poly(2,2'-dihydroxyphenylpropane) carbonate, polydiethyleneglycol bis(allylcarbonate), polymethylmethacrylate and polystyrene, or blends thereof. In one embodiment the at least one light pipe is made from PMMA. Here, the term "light pipe" can be used to refer to a tubular structure that is adapted to transport light. Light might be coupled into the light pipe at one, or at both ends of the at least one light pipe. The light is then being radiated from the at least one light pipe along its length, or at least along part of its length.

The hardcoating may evenly diffuse the light output. This may provide an easier way to turn normal clear pieces into light pipes by adding a coating rather than any built-in particles. As the amount of scattering/illumination would be determined by the hardcoating, it could be selectively applied and/or applied in different thicknesses to change the pattern of the light emitted.

The hardcoating may have a thickness that can provide the desired property and that can be determined by the skilled person.

The hardcoating may be selected from triethoxysilane, methyltrimethoxyethoxysilane, methyltriacetoxysilane, methyltripropoxysilane, methyltributoxysilane, ethyltrimethoxysilane, ethyltriethoxysilane, vinyltrimethoxysilane, vinyltriethoxysilane, vinyltracetoxysilane, vinyltrimethoxyethoxysilane, phenyltrimethoxysilane, phenyltriethoxysilane, phenyltriacetoxysilane, gamma-chloropropyltrimethoxysilane, gamma-chloropropyltriethoxysilane, gamma-chloropropyltripropoxysilane, 3,3,3-trifluoropropyltrimethoxysilane gamma-glycidoxypropyltrimethoxysilane, gamma-glycidoxypropyltriethoxysilane, gamma-(beta-glycidoxyethoxy)propyltrimethoxysilane, beta-(3,4-epoxycyclohexyl)ethyltrimethoxysilane, beta-(3,4-epoxycyclohexyl)ethyltriethoxysilane, gamma-methacryloxypropyltri methyoxysilane, gamma-aminopropyltrimethoxysilane, gamma-aminopropyltriethoxysilane, gamma-meraptopropyltrimethoxysilane, gamma-mercaptopropyltriethoxysilane, N-beta(aminoethyl)-gammaaminopropyltrimethoxysilane, beta-cyanoethyltriethoxysilane and the like; dimethyldimethoxysilane, phenylmethyldimethoxysilane, dimethyldiethoxysilane, phenylmethyldiethoxysilane, gamma-glycidoxypropylmethyldimethoxysilane, gamma-glycidoxypropyl methyldiethoxysilane, gamma-glycidoxypropyl phenyldimethoxysilane, gamma-glycidoxypropyl phenyldiethoxysilane, gamma-chloropropylmethyldimethoxysilane, gamma-chloropropylmethyldiethoxysilane, dimethyldiacetoxysilane, gamma-methacryloxypropyl methyldimethoxysilane, gamma-metacryloxypropylmethyldiethoxysilane, gamma-mercaptopropyl methyldimethoxysilane, gamma-mercaptopropylmethyldiethoxysilane, gamma-aminopropylmethyldimethoxysilane, gamma-aminopropylmethyldiethoxysilane, methylvinyldimethoxysilane, methylvinyldiethoxysilane and the like.

The coating may have a different refractive index compared to the refractive index of the material of the light pipe, the indicating element, the optical conduit, the legs and/or the light guide. This could either be for the purposes of restricting light loss by increasing internal reflections or increase the amount of light escaping by reducing the internal reflection angle. For example, the coating may have a lower refractive index than the material of the at least one light pipe.

For example, the faded marks may be introduced into the at least one light pipe by choosing at least one additive for the respective plastic.

The lamp unit according to the invention is a lamp unit in which the interior of the system, for example the light source, light guide etc., which is switchable between an on state and an off state, is hidden until illumination is turned on so that the light produced in the inside the system can be seen from outside ("Hidden Till Lit" (HTL)). Thus, for example, any logo or emblem which was hidden will be visible only then.

In embodiments of the present invention, the front surface of the lens is a polished, textured or machined surface. When the transparent and/or translucent coating is deposited on a polished, textured or machined substrate surface it provides a visible surface that is either a highly polished metal looking surface or a textured metal surface that replicates metal finishing, for example brushed stainless steel.

The invention also proposes that the lens has an outer component, preferably made from a clear material mentioned above, and an inner component, preferably over moulded on the inner surface of the outer component and/or made from opaque material. The lens inner component material optic properties can be selected to additionally increase or decrease the reflected light back into the light pipe. A highly reflective material will increase the final light output level, a non-reflective material will reduce the overall final light output level.

The lens may be formed by any process known in the art, such as, for example, injection molding and/or thermoforming, but is not limited thereto.

The lens may include a pre-coated film in the form of either a hardcoat, a silicon hardcoat, an inorganic oxide, or a thin metal film, or a combination of such pre-coated films.

The coating may have a thickness of 200 nm, 100 nm, be in the range of from 40 nm to 80 nm, be in the range of from 50 nm to 70 nm, or be about 60 nm.

The coating may have a minimum light transmission of 5% to a maximum of 100%. In some embodiments, the light transmission of the coating is from 5% to 20%. The light transmission of the transparent and/or translucent coating may be 5%, 6%, 7%, 8%, 9%, 10%, 11%, 12%, 13%, 14%, 15%, 16%, 17%, 18%, 19% or 20%. In specific embodiments, the light transmission of the transparent and/or translucent coating is about 8%. The transmission may depend on the coating used and thus can be adjusted.

The transparent and/or translucent coating may be part of a multilayer transparent and/or translucent stack on the front surface of the lens. The multilayer stack may comprise other layers such as hard coat layers, and the like. For example, a hard coat can be applied to the lens either on top of the transparent and/or translucent coating or between the lens and the transparent and/or translucent coating. The hard coat may be formed from one or more abrasion resistant layers. As is known in the art, a primer layer may be used between the hard coat and the lens or the transparent and/or translucent coating to enhance adhesion of the hard coat. The hard coat can be formed from one or more of a range of materials known for this purpose in the art, including an organosilicon, an acrylic, a urethane, a melamine or an amorphous organosilicon (SiOxCyHz). Organosilicon hard coats are particularly suitable and suitable materials include Silicone Hard Coat SHC 5020 from Momentive and GE587B from MomentiveGE Bayer. The hard coating material may be applied in a solvent, such as an alcohol solvent. The hard coat can be applied using any of the coating techniques known in the art, including flow coating, dip coating, spray coating, spin coating, etc. and then cured using techniques known in the art, such as heating to a temperature of about 100° C. to about 200° C. for the appropriate required period of time. Intermediate layers may be deposited between the respective layers of the multilayer stack. The intermediate layers may assist in adhesion between the respective layers and minimize or prevent delamination. The intermediate layers will generally be translucent and may be formed from silica.

The transparent and/or translucent coating can be deposited using any suitable elemental deposition technique, including Physical Vapour Deposition (PVD), Chemical Vapour Deposition (CVD), or the like.

The at least one light source may be any source that can be used to provide the required amount of light, either light of one color or lights of different color. For example, at least one light source may be used, wherein two or more light sources may also be encompassed by the present invention. For example, if two or more light sources are used, each light source may provide light in a different color or in a different brightness.

Also provided herein is a lamp unit, wherein two or more light pipes may be present at the same location, wherein at least one light pipe can be seen from the outside and wherein one or more of the other light pipes are coated with a chromium-based reflective coating. For example, the chromium-based reflective coating is behind where the two or more light pipes meet.

This arrangement may avoid problems relating to poor efficiency of a transparent and/or translucent coating to maintain an inability for the user to observe the light source (i.e. for it to be hidden). To have two distinct light paths, that is one that can be seen when viewed from external to the part that can only see a coated colored area (i.e. the coating is behind where the two paths meet) and another path that allows the light emission to not have to pass through the poor efficiency coating may help to eliminate such problems.

Referring to FIGS. 1 to 10, there is shown a combined antenna and indicator module 100 for mounting on a vehicle 10, including an antenna housing 160, including an electrical circuit 140 including at least one source 142 element for emitting luminescent radiation, the at least one source element 142 being located internally within the housing 160 so as not to be visible externally. The housing 160 further including an indicating element 152 for releasing luminescent radiation received from the at least one source element 142 for viewing externally, and an optical conduit 154 for providing an optical couple between the at least one source element 142 and the indicating element 152. The module 100 further comprising at least one antenna element supported by or within the housing 160.

Referring now to FIG. 1, there is shown a partial rear perspective view of a vehicle 10, having a roof surface 20, on which are mounted two combined antenna and indicator modules 100.

Figure 2A:
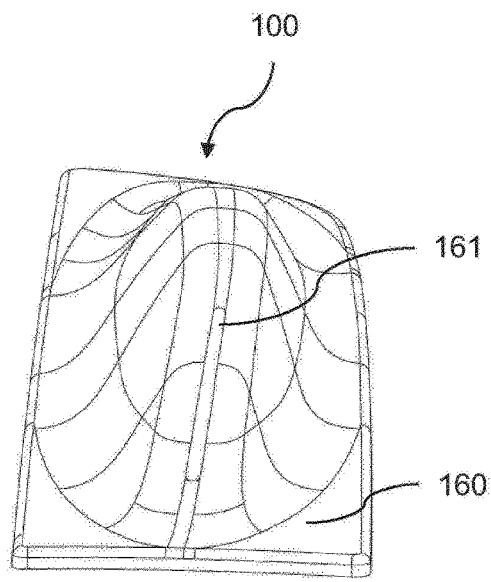
FIG. 2a is a rear perspective view of an indicator module in an unlit state.
Figure 2B:
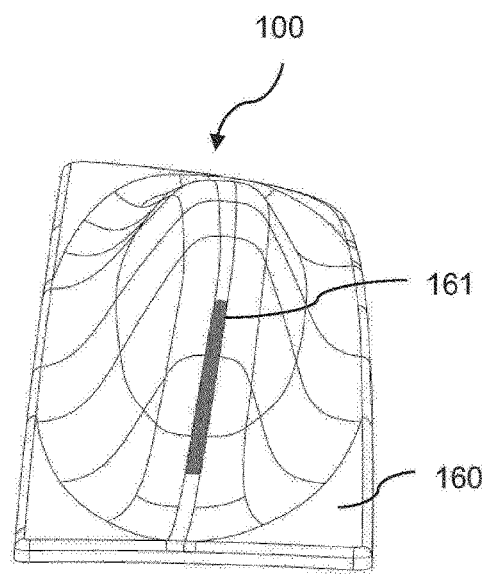
FIG. 2b is a rear perspective view of the indicator module in a lit state.

FIGS. 2a and 2b show rear perspective views of a combined antenna and indicator module 100 in un-lit and lit states, respectively. Said module 100 features an antenna housing 160 configured to accommodate the electrical circuit 140, indicating element 152 and optical conduit 154 between the enclosure element provided by the antenna housing 160 and the vehicle 10. The antenna housing 160 comprises, as can be seen best in FIGS. 7 and 8, an opaque inner layer 162 and a tinted outer layer 163, wherein the antenna housing 160 features a window 161 in the opaque inner layer 162 which allows light to pass through the antenna housing 160. In one form, the window 161 allows light transmission of between 5-75%. In another form, the window 161 allows light transmission of between 10-75%.

Figure 3:
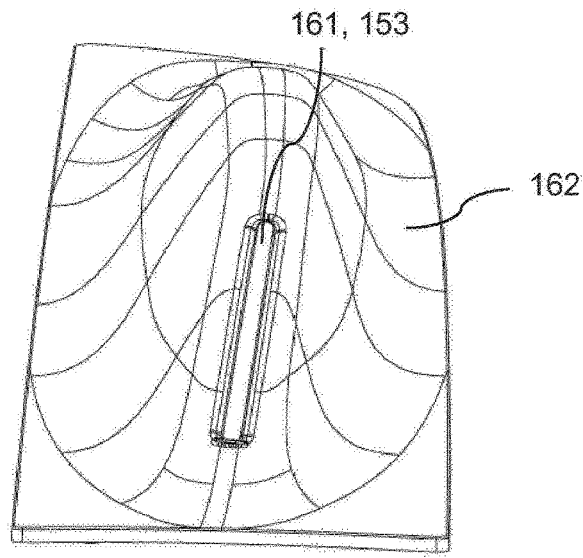
FIG. 3 is a rear perspective view of the indicator module of FIG. 2a, with the light transmissive outer layer of the enclosure element removed.
Figure 8:
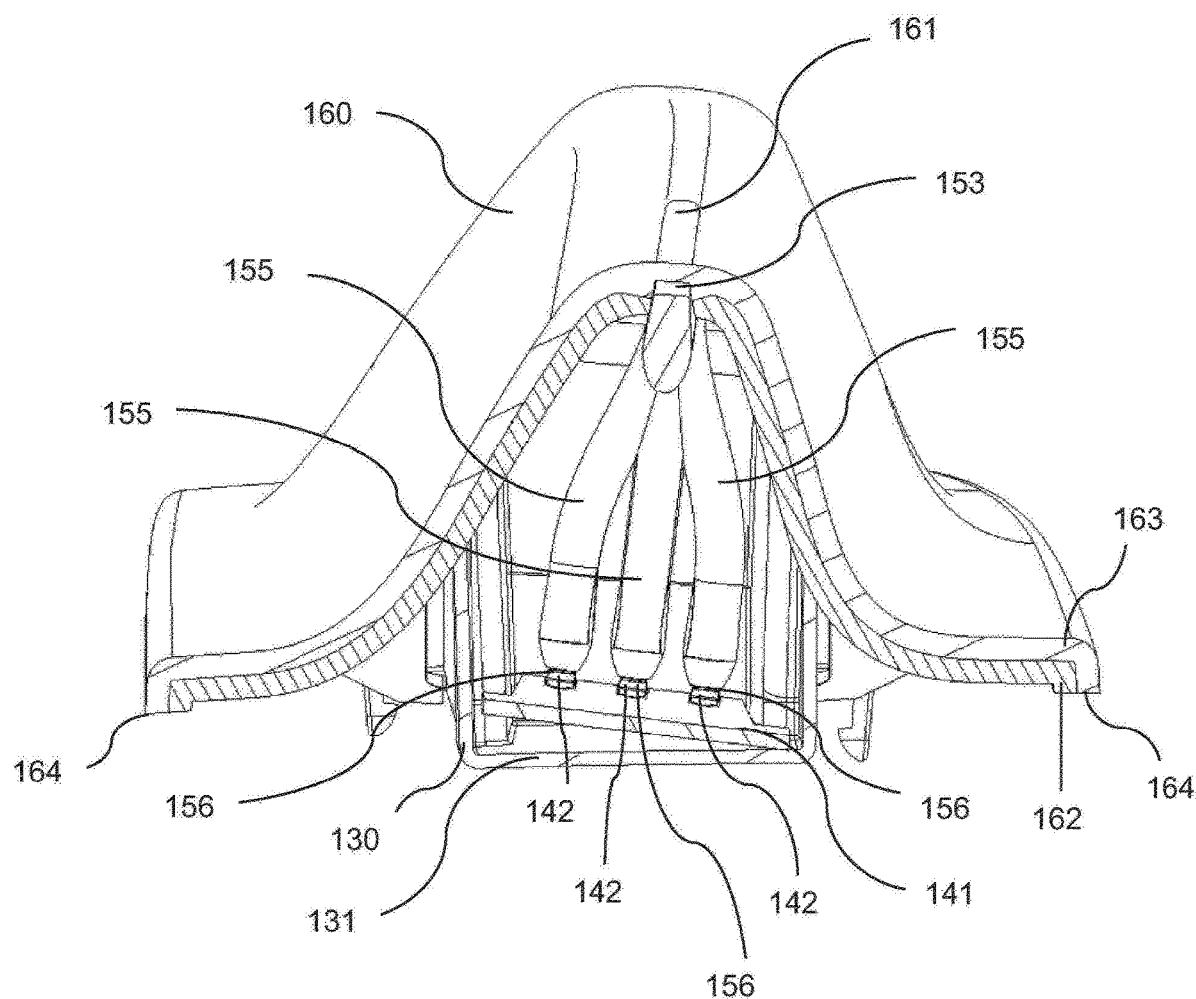

FIG. 3 is a rear perspective view of the combined antenna and indicator module 100 with the outer layer 163 of the antenna housing 160 removed to reveal the inner layer 162 and the window 161. Positioned within the opening created by the window 161 is the light emitting surface 153 of a light guide 150 which will be discussed in further detail below. FIG. 8 shows how the light emitting surface 153 is located within the window 161 and adjacent to the outer layer 163 such that light emitted by the light emitting surface 153 is directed toward and through the outer layer 163 of the antenna housing 160.

In FIG. 2a, the light guide 150 is not visible because the outer layer 163 is tinted. FIG. 2b shows that when the light guide 150 is illuminated, the light guide 150 lights up and emits light across its light emitting surface 153 with substantially uniform luminous intensity.

Figure 4:
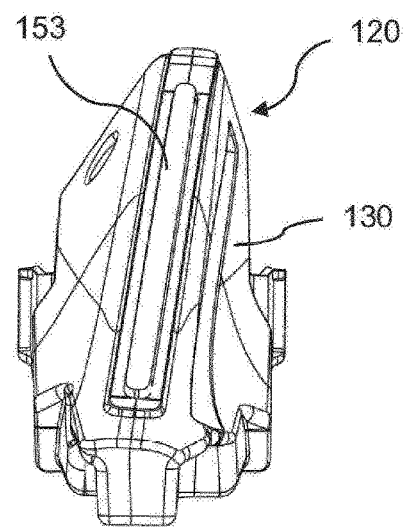
FIG. 4 is a rear perspective view of an lighting module, according to an embodiment of the invention.

Referring now to FIG. 4 where there is shown a rear perspective view of a lighting module 120, according to an embodiment. The lighting module 120 comprises a cover element 130 through which protrudes the light emitting surface 153 of the light guide 150.

Figure 5:
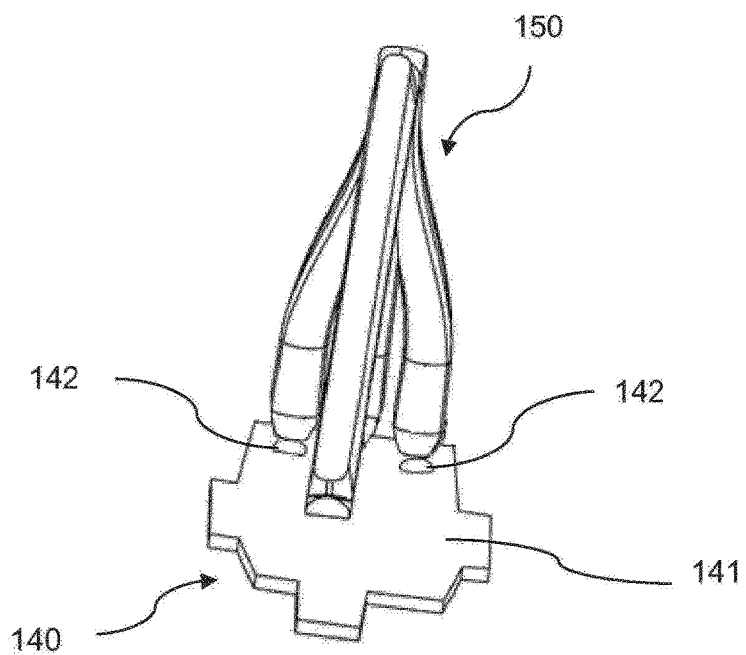
FIG. 5 is a rear perspective view of the lighting module of FIG. 4 with the cover element removed.
Figure 6A:
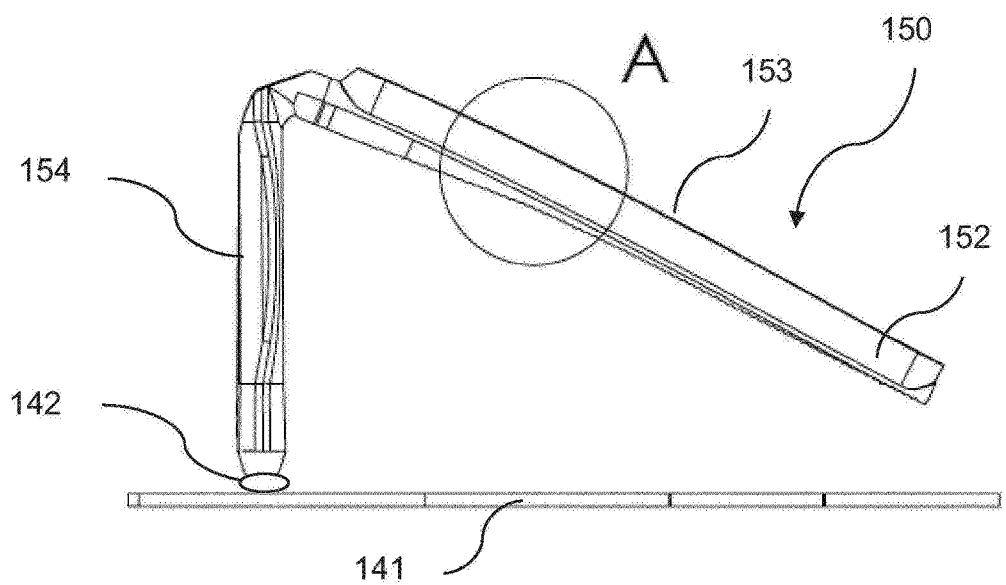
FIG. 6a is a side view of the lighting module of FIG. 4 with the cover element removed to reveal the light guide and electrical circuit.
Figure 6B:
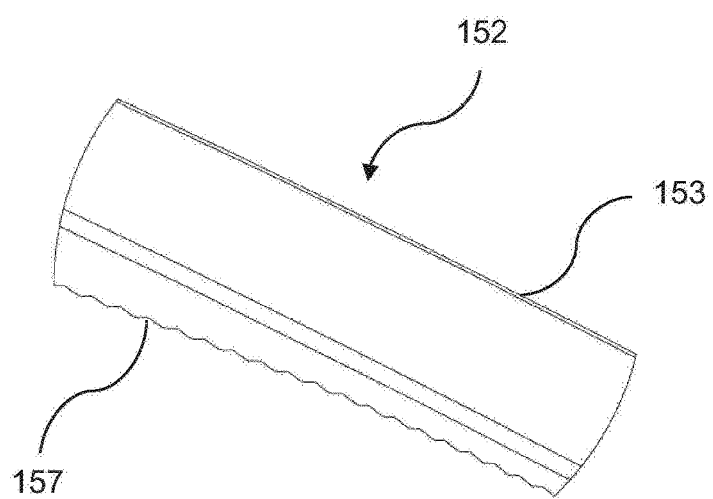

FIGS. 5, 6a and 6b show the lighting module 120 with the cover element 130 removed to reveal the light guide 150 and corresponding electrical circuit 140. The electrical circuit 140 comprises a printed circuit board (PCB) 141 and three source elements for emitting luminescent radiation (light), in this embodiment, the source elements are light emitting diodes (LEDs) 142.

It is desirable that the module 100 is capable of producing multi-coloured light output. This may be achieved through the use of a source element comprising one or more RGB LEDs or three or more single colour chip LEDs, where the single colour chip LEDs are a separate red, a separate green and a separate blue chip LED, both LED solutions being used to mix colours and produce multi-colour outputs.

It will be appreciated that in alternative embodiments, the type and number of LEDs will depend on required light output, colour range and intensity. Electrical circuit 140 may also be configured such that either the combination of RGB LEDs or individual colour chip LEDs may be used with the same light guide 150.

The light guide 150 has a unitary body comprising an indicating element 152 and an optical conduit 154. The indicating element 152 comprises a light emitting surface 153 viewable to an external viewer of the module 100 through the window 161 in the cover element 160. The optical conduit 154 provides an optical couple between the LEDs 142 and the indicating element 152.

In FIG. 6b it can be seen that the indicating element 152 features discrete optics in the form of a plurality of angled surfaces 157 which direct light toward the light emitting surface 153. In some embodiments, the optics may be in the form of surface defects or etchings.

The light 150 guide may be manufactured from an acrylic resin or polymer uses the properties of total internal reflection to direct the light from the LEDs 142 toward the light emitting surface 153.

Referring now to FIG. 8 where it is shown that the optical conduit 154 comprises three legs 155, each having a light receiving surface 156 for receiving luminescent radiation from a corresponding LED 142. The legs 155 join together and connect to the indicating element 152. It will be appreciated that the optical conduit 154 has a defined length to allow colour mixing in the event that separate red, green and blue LEDs are used.

Figure 10:
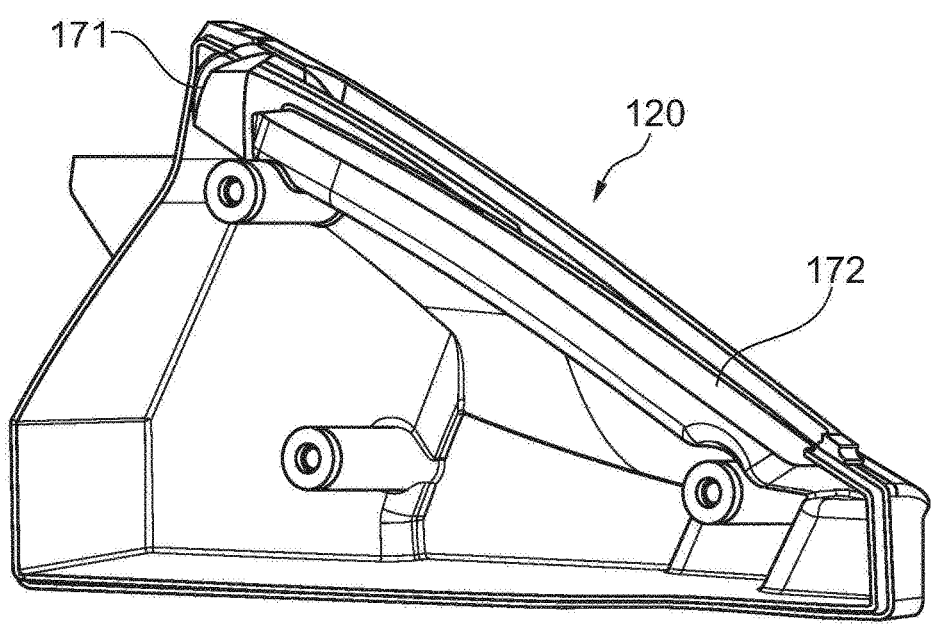
FIG. 10 is a cross-sectional view of the lighting module of FIG. 4 detailing the location of the reflector elements.
Figure 11:
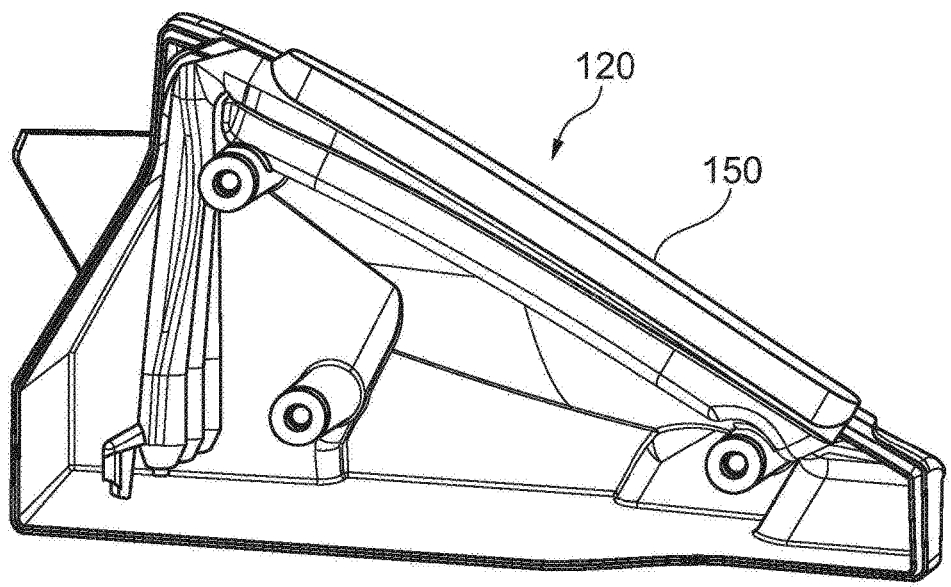
FIG. 11 is a cross-sectional view of the lighting module of FIG. 4 detailing the location of the light guide.

Referring now to FIG. 10, where there is shown a cross-sectional view of the lighting module 120 where reflector elements 171, 172 may be located to improve the optical efficiency of the lighting module. A first reflector element 171 may be positioned at the bend in the light guide 150, and a second reflector element 172 may be positioned under the optics 157 of the indicating element 152. FIG. 11 shows the details of the light guide 150 of the lighting module 120 in cross-section.

It will be appreciated that in alternative embodiments, one or all of the electrical circuit, indicating element and optical conduit could be supported by or within the antenna housing 160, without the need for a discrete lighting module 120 and associated cover element 130.

It will also be appreciated that the lighting module may be separately supplied, or come in multiple variants, such that the antenna housing may be configured to retrofit over said lighting module.

Figure 7:
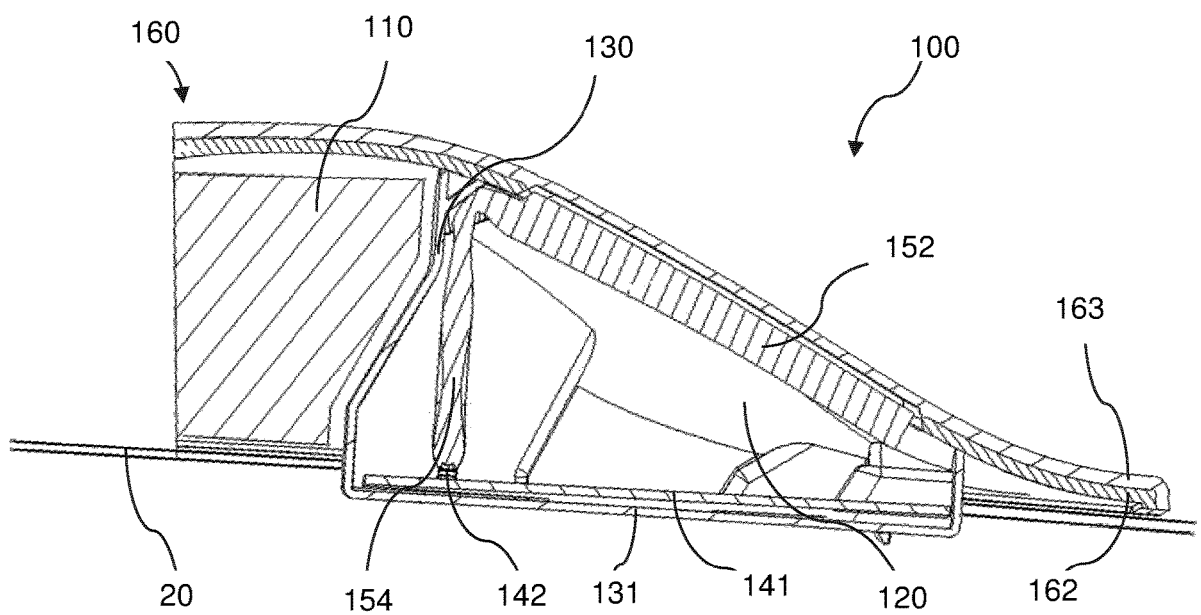

Referring now to FIG. 7 where there is shown a partial cross-sectional view of the combined antenna and indicator module 100 of FIG. 2 mounted on the vehicle roof surface 20. It can be seen that the antenna housing 160 is configured to accommodate a utility item, such as an antenna module comprising one or more antenna elements. An antenna module 110 is located in a forward portion of the antenna housing 160, such that it is enclosed between the antenna housing 160 and the roof surface 20 of the vehicle 10. Located rearward of the antenna module 110 is the lighting module 120, which is also located between the antenna housing 160 and the roof surface 20 of the vehicle 10.

It can be seen in both FIG. 7 and FIG. 8 that the lower portion of cover element 130 features an electrical circuit receiving recess 131 configured to receive or support the electrical circuit 140. It can also be seen that the housing comprises a vehicle roof surface engaging portion 164 disposed around the perimeter of the housing 160 where it comes in contact with the vehicle roof surface 20, and around the electrical circuit receiving recess 131. It will be appreciated that when the housing 160 is mounted on a vehicle roof surface 20, the recess 131 may project into a corresponding recess or aperture within the vehicle roof surface 20 such that the recess 131 and the electrical circuit 140 sit below the vehicle roof surface 20.

The antenna module 110 houses at least one antenna element for receiving and/or transmitting radio transmissions, wherein in use, the or each antenna element will have a corresponding radiation or receiving pattern, relating to the directivity of the or each antenna element.

Figure 9:
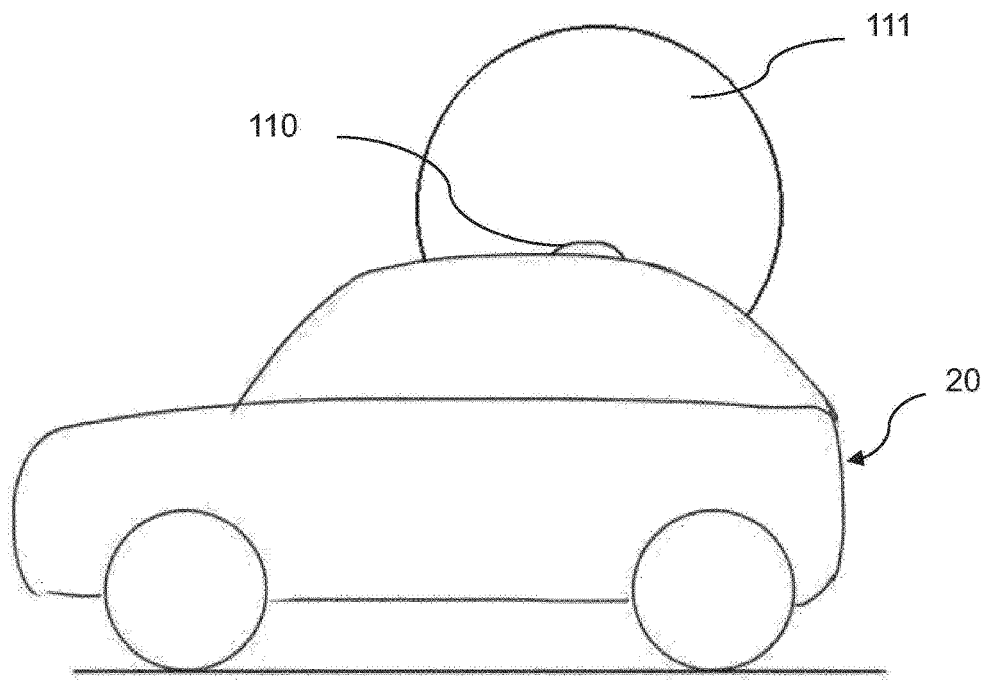
FIG. 9 is diagram illustrating the ideal radiation pattern for the antenna elements.

It will be appreciated that said antenna element(s) is/are for transmitting or receiving signals to and from corresponding antenna located externally to the vehicle 10, such that an ideal radiation or receiving pattern (referred to as the ideal pattern) of the or each antenna element projects outwardly from the roof 20 of the vehicle 10. FIG. 9 provides a diagram illustrating an idealised projected radiation pattern 111 for the antenna elements located within the antenna module 110.

It can be seen in FIG. 7 that the electrical circuit 140 (including the LEDs 142) is mounted below the antenna module 110 such that it is positioned outside of the projected pattern of the or each antenna element. By positioning the electrical circuit 140 below the antenna module 110, the antenna elements are less likely to be affected by the electrical circuit 140, and the characteristics of the antenna elements can be maintained.

It can be seen in FIG. 7 that the light guide 150 is positioned adjacent to the antenna module 110 such that it is positioned substantially within the ideal pattern of the antenna elements. The light guide 150 will have negligible (if any) influence on the characteristics of the antenna elements by virtue of the fact that it is a non-metallic optical couple, which does not act as an antenna producing electromagnetic interference.

It will be appreciated that it in alternative embodiments, one or more of the antenna elements may be directly or indirectly supported by or within the antenna housing 160, without the need for a discrete antenna module.

It will also be appreciated that an antenna module may be separately supplied for installation on a vehicle and that the antenna housing may be configured to be retrofit over said antenna module.

It will be appreciated that the use of the light guide 150 provides luminescent radiation from the indicating element 152, at a position within the projected pattern of the antenna elements while all electronic and metallic componentry is able to be mounted as low as possible relative to the antenna elements, thus reducing the inhibition of radio waveforms to and from the antenna elements.

As illustrated in FIG. 12, an antenna housing 200, only partly shown in FIG. 12, like housing 160, a light pipe 40 at least partly formed by an indicating element like indicating element 152, an optical conduit like optical conduit 154, legs like the legs 155 and/or a light guide like light guide 150, and a clear lens 60, at least partly formed by a window like the window 161, form at least partly a lamp unit 50 that is especially only pictured in extracts. Although not illustrated, a light foil may be arranged within the lamp unit 50 in accordance with the description of this application. Details related to the light foil are provided at least in reference to FIG. 17 and its accompanying description. The following three components may be manufactured in an injection molding process. For example, the light pipe 40 can be produced out of PC in a first phase, the clear lens 60 out of crystal-clear or tinted PMMA in a second phase, and the housing 200 out of ABS (acrylonitrile-butadiene-styrene) in a third phase. As a result, one unit is formed, for example, as illustrated in FIGS. 13 and 14 in longitudinal section and cross-section, respectively.

Still referring to FIGS. 12-14, the housing 200 might be formed with a back panel 22 and two webs 24 and 26 to receive the light pipe 40 between the webs 24 and 26 on the back panel 22. In addition, a recess 28 like receiving recess 131 for a light source, which is not illustrated, is provided.

The light pipe 40 features one end having at least one light incoupling area 42 like light receiving surface 156 adjacent to an installation space 30. Its surface, which borders the lower surface of the clear lens 60, can be provided with a lens system 44 which provides the total reflection areas 46 and outcoupling area 48 for the light that enters the light pipe 40 at each incoupling area 42. Because the clear lens 60 is formed with a corresponding lens system 62 on its surface opposite the lens system 44 of the light pipe 40, and also because the refractive indexes of the plastics of the clear lens 60 and of the light pipe 40 differ, total reflection at the outcoupling areas 48 is excluded.

Figure 15:
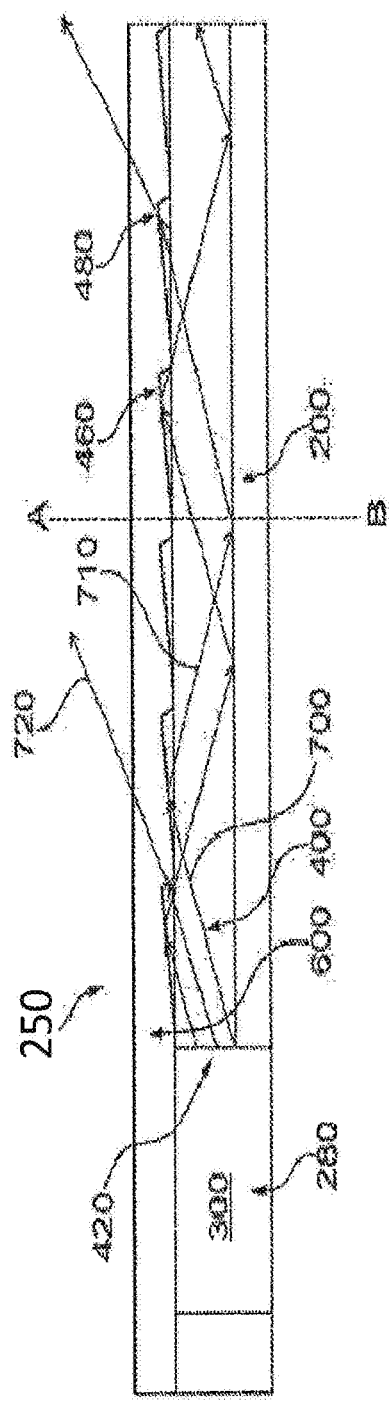
FIG. 15 is a diagram illustrating a part of an alternative lamp unit in longitudinal section.
Figure 16:
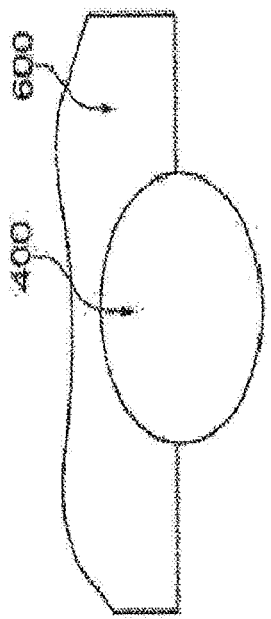
FIG. 16 is a diagram illustrating a cross-sectional view along the line A-B in FIG. 15.

The optical path within the lamp unit 50 produced according an example will be explained in more detail below in reference to FIGS. 15 and 16.

The illustrated lamp unit 250 differs from the lamp unit 50 due to a different geometry for the light pipe, whereas the light pipe 40 of the lamp unit 50 has a rectangular shaped cross section. The clear lens 60, the light pipe 400 of the lamp unit 250 has a circular cross section, as illustrated in FIG. 16. In addition, the shape of the housing 200 and the clear lens 600 of the lamp unit 250 of FIGS. 15 and 16 is also adapted to have this circular shape.

The housing 200 is again configured into an installation space 300 for a light source by means of a recess 280.

The light pipe 400 in turn features incoupling areas 420 for light rays from the light source, these light rays propagating in the form of the light rays 700 in the light pipe 400 in order to be deflected into the total reflecting light rays 710 at the total reflection areas 460 and into the light rays 720 leaving the lamp unit 250 at the outcoupling areas 480.

The shape of the clear lens 600 is adapted not only to the shape of the light pipe 400, but can also satisfy any design requirements on the lamp unit 250. For example, the surface can feature a wave form as illustrated in FIG. 16 or might have another form to form the before described window.

Figure 17:
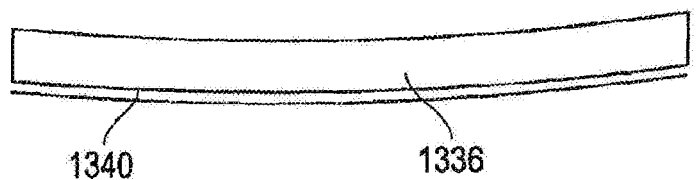
FIG. 17 depicts a cross section of a clear lens with a coating.

FIG. 17 depicts a polymeric substrate in form of a clear lens 1336 or rather light window provided with a coating 1340. The coating 1340 is at least in part permeable to light originating for example from a not shown light pipe but also a light foil placed behind the clear lens 1336. The light foil might form a second light source. Such light foils are known in form of for example light tapes of the company Light Tape Limited or in form of a printed lighting as distributed by the company Center of Process Innovation Limited. Making usage of such a light foil reduced the overall weight of the lamp unit and enables the production of small modules. Still further, the use of light foils allows in-process integration as it can be inserted into a mold and over-mold.

Still further, the light foil might be connected with a not shown control unit. The control unit can be connected to the printed circuit board and a control device within the vehicle to which the antenna housing with the lamp unit is attached. In order to also hide the light foil as long as it is not lit, the lens 1336 at least partly formed by a window can be coated with a reflective coating which is translucent.

Thus, it is possible to hide both light sources, i.e. the printed circuit board, the LED and the light foil, by making usage of the lens 1336 together with the coating 1340. The light unit can be integrated into a casing with a coating such that the whole surface will have an appealing look. As soon as the light foil is lit, respective light rays will pass not only through the lens 1336 but also a coating 1340 thereon. But the first light source and the light pipe will remain hidden.

The rear view device can also be equipped with different illumination devices.

In further not shown embodiments light rays may be emitted from a light foil within a lamp unit as well as a light cone decoupled from a light pipe of a first light source into which light from an LED is coupled. The light cone might be emitted at longitudinal end of the light pipe whereas the light from the light foil might be transmitted and emitted in a direction perpendicular to the longitudinal axis of the light pipe. Different functions can be fulfilled by said light rays emitted by the light foil and said light cone.

For example the lamp unit can be a turn signal indicator module of a vehicle such that the light cone has to fulfill the ECE (Economic Commission for Europe) regulations ensuring that a region beginning from 5° from the longitudinal axis of the vehicle, up to 60° to the longitudinal axis of the vehicle in the opposite direction of movement is light up. The light rays could provide a decorative effect or additional warning effect.

In a not shown alternative embodiment of a multifunctional lamp unit of the invention in contrast to the lamp unit described before the lamp unit has three light sources. In fact, the lamp unit makes usage not only of a first printed circuit board and a first LED for coupling light into a first conductor and/or light pipe and a light foil, but in addition uses a second printed circuit board and/or a second LED for coupling light into a second conductor and/or light pipe. The light foil extends again along a lens and overlaps both of the other two light sources as well as the respective light pipes. The lens is coated with the translucent chromium-based coat, but does not have to be coated.

Thus, in addition to the first light source and the second light source the lamp unit comprises the third light source each generating light cones decoupled from respective light pipe.

A multifunction lamp unit might emit light rays along its lens in analogy to the lamp unit explained before and light might be decoupled from two light pipes. In fact, a first light pipe might guide all light to one end of the first light pipe such that there is a light cone, whereas a second light pipe might decouples light along its extension.

Each of the light cones as well as the light rays emitted from the light foil can fulfill different functions. For example, the light cone could be used as a turn signal, whereas another light cone emitted into another direction could be used as an approach light and the light rays emitted from the light foil could have decorative purposes.

Thus respective light cones can be decoupled into selected directions. Said directions depend on the functions to be fulfilled. In addition a light foil can be used emitting light ray homogeneously along the lens.

In a further not shown embodiment a lamp unit of the invention might be installed within an inventive module. A casing part of the housing of the module might overlap one side of the lamp unit, which can be the underside. The casing part is provided with a transparent region through which a light cone or light rays can be emitted on the ground in order to provide a puddle light function. The light cone could come from a specially oriented third light source and/or light pipe.

In a further embodiment a still further lamp unit might be arranged within an inventive module and/or housing, e.g. comprising a camera port, having a casing part with an opening. A light pipe might extend from the lamp unit towards the opening within the casing part such that light can be guided into a specific direction to fulfill a specific function which could be the function of a logo lamp.

Different functions and devices can be incorporated into and/or controlled with the help of a combined antenna and indicator module. For example, useful are functions and devices to enhance, extend and/or sustain the functionality of the combined antenna and indicator module during normal or extreme conditions. This can comprise heating and/or cooling means, cleaning means, liquid and/or gaseous sprays, actuator means for moving the module or parts of it, such as for example, a camera system and/or parts of a camera system, comprising for example lenses, filters, light sources, adaptive optics like deformable mirrors, sensors and/or mirrors, and/or actuator means for inducing movement of other objects, for example parts of the vehicle and/or objects surrounding the vehicle. Furthermore it can comprise linear tracks and/or rotating wheels, like for example a filter wheel, for exchanging optical elements, comprising for example lenses, mirrors, light sources, sensors, adaptive optics like deformable mirrors and/or filters.

Prominent examples for functions and devices incorporated into and/or controlled with the help of A combined antenna and indicator modules comprise illumination devices, for example any kind of light module like an external light module, an internal light module, a front light, a back light, a fog light, a brake light, an acceleration light, a turn signal, a logo lamp, a puddle light, a flash light, a navigation light, a position light, an emergency light, a spotlight, a green light, a red light, a warning light, a turn signal light module, an approach light, a search light, an information light, a display and/or any combination thereof.

Further examples for functions and devices incorporated into and/or controlled with the help of A combined antenna and indicator module can comprise for example a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, comprising for example an ejection seat system, a direction indicator, an approach system, a strong braking system, an emergency braking system, a charging status indicator, a vehicle mode system, comprising for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

An optical light pipe for a vehicle lighting unit is described in European Patent No. 2947378, filed on May 22, 2014 for OPTICAL LIGHT GUIDE FOR A VEHICLE LIGHTING UNIT, which is hereby incorporated herein by reference in its entirety for all purposes. In addition, an illumination device and a method for producing the same are described in International Patent Application Publication No. WO 2016/147154, filed on Mar. 18, 2016 for ILLUMINATION DEVICE AND METHOD FOR PRODUCING AN ILLUMINATION DEVICE and claiming priority to German Patent Application No. 102015104163, filed on Mar. 19, 2015 for ILLUMINATION DEVICE AND METHOD FOR PRODUCING AN ILLUMINATION DEVICE, each of which is hereby incorporated herein by reference in its entirety for all purposes. A lighting device for a vehicle component including a logo lamp and a deflection mirror are described in European Patent Application No. 3144183, filed on Sep. 13, 2016 for LIGHTING DEVICE, VEHICLE COMPONENT AND VEHICLE and claiming priority to German Utility Patent Application No. 202015104894, filed on Sep. 15, 2015 for LIGHTING DEVICE, VEHICLE COMPONENT AND VEHICLE, each of which is hereby incorporated herein by reference in its entirety for all purposes.

A camera module may include a plurality of different optical elements, such as but not limited to a variety of sensors, light sources, and housing parts.

The housing of a camera module may be made out of plastic, metal, glass, any other suitable material and/or any combinations thereof and may be used in combination with the techniques described below to change or modify the properties of the material or the material surface. Housings are, for example, described in German Patent Application No. 102016108247.3, filed on May 3, 2016 for CLEANING SYSTEM FOR A CAMERA and U.S. patent application Ser. No. 15/281,780, filed on Sep. 30, 2016 for TELESCOPING REAR VIEW ASSEMBLY WITH CAMERA AND LENS WIPING SYSTEM, each of which is hereby incorporated herein by reference in its entirety for all purposes.

The camera may include for example CCD or CMOS or light field sensors, as for example described in German Patent Application No. 102011053999, filed Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION and U.S. patent application Ser. No. 09/771,140, filed on Jan. 26, 2001 for MONITORING DEVICE FOR VEHICLES, IN PARTICULAR, MOTOR VEHICLES, now U.S. Pat. No. 6,703,925, each of which is hereby incorporated herein by reference in its entirety for all purposes. Also an area of the sensor can be reserved for different purposes, for example to detect a test beam, as described in U.S. Pat. No. 8,031,224, filed on Sep. 9, 2014 for CAMERA SYSTEM, METHOD FOR OPERATION OF A CAMERA SYSTEM AND SENSOR DEVICE OF A CAMERA SYSTEM, which is hereby incorporated herein by reference in its entirety for all purposes.

The optical elements may be molded or formed from any type of glass or any other suitable material. Glass is herein defined as a non-crystalline amorphous solid showing a glass transition when heated towards the liquid state. It includes, for example, the group of polymeric glasses, metallic glasses, silica glasses, but any other suitable material showing the glass transition may be used. The glass may be in a flat, wedge, rectangular, cylindrical, spherical, conical, elliptical, and/or circular shape, as described for example in German Patent Application No. 102016108247.3, and German Patent Application No. 102011103200, filed on May 31, 2011 for LIGHT WINDOW FOR USE AS LIGHT CONDUCTOR FOR TURN INDICATOR IN OUTSIDE MIRROR ARRANGEMENT OF VEHICLE, HAS UNCOUPLING STRUCTURES AT CERTAIN LOCATION OF WINDOW, AND OPTICAL FILM WITH MOLDED COATING AND PROVIDED WITH UNCOUPLING STRUCTURES, each of which is hereby incorporated herein by reference in its entirety for all purposes. The glass may also have a shape according to different needs or lens types. As non-limiting examples, camera modules may be equipped with lenses, like a wide-angle or fish-eye lens suitable to provide peripheral images, as described in U.S. patent application Ser. No. 15/281,780, and U.S. patent application Ser. No. 13/090,127, filed on Apr. 19, 2011 for REAR VIEW MIRROR SIMULATION, now U.S. Pat. No. 9,238,434, a Fresnel lens or micro lenses as described in German Patent Application No. 102011053999, filed on Sep. 28, 2011 for DETECTION SYSTEM FOR OPTICAL DETECTION OF OBJECT AND/OR REGION OF SPACE FOR DRIVER ASSISTANCE AND/OR DISPLAY SYSTEMS OF MOTOR VEHICLE, HAS OPTICAL SENSOR ARRANGED AS LIGHT FIELD SENSOR FOR DETECTION, and a TIR (total internal reflection) lens as described in U.S. Pat. No. 8,740,427, filed on Sep. 8, 2010 for OPTIMAL LIGHT COUPLING FOR REAR VIEW DEVICES, each of which is hereby incorporated herein by reference in its entirety for all purposes. Another type of optical element know to be used in camera modules are optical fibers, such as fiber bundles and preferably fiber bundles having an optical head, as described for example in U.S. patent application Ser. No. 09/771,140, filed on Jan. 26, 2001 for MONITORING DEVICE FOR VEHICLES, IN PARTICULAR, MOTOR VEHICLES, now U.S. Pat. No. 6,703,925, which is hereby incorporated by reference herein in its entirety for all purposes. Different methods can be used to produce such optical elements, for example as described in U.S. Pat. No. 8,460,060, filed on Jan. 30, 2009 for METHOD FOR CREATING A COMPLEX SURFACE ON A SUBSTRATE OF GLASS, which is hereby incorporated herein by reference herein in its entirety for all purposes.

The optical elements can be transparent as described for example in U.S. Pat. No. 8,031,224, German Patent Application No. 102016108247.3, and U.S. patent application Ser. No. 13/242,829, filed on Sep. 23, 2011 and published as U.S. Patent Application Publication No. 2012/0154587 for CAMERA ARRANGEMENT AND DOOR HANDLE FOR MOTOR VEHICLE, each of which is hereby incorporated herein by reference in its entirety for all purposes. But the optical elements can also be semitransparent, as described in U.S. patent application Ser. No. 09/771,140 and U.S. patent application Ser. No. 13/090,127, each of which is hereby incorporated herein by reference in its entirety for all purposes. Still further, the optical elements can be completely or partially coated with different types of coatings to realize different effects, such as for example anti-reflective coatings as described in U.S. Pat. No. 8,031,224, chromium-based reflective coatings as described in U.S. Pat. No. 9,181,616, filed on Jan. 24, 2012 for CHROMIUM-BASED REFLECTIVE COATING, and other coatings, for example for polymeric substrates as described in U.S. patent application Ser. No. 14/936,024, filed on Nov. 9, 2015 for COATED POLYMERIC SUBSTRATES and in U.S. patent application Ser. No. 15/124,310, filed on Feb. 20, 2015 and published as U.S. Patent Application Publication No. 2017/0015802 for DECORATIVE COATINGS FOR PLASTIC SUBSTRATES, each of which is hereby incorporated herein by reference in its entirety for all purposes. Preferably the optical elements are made of a scratch-proof material as described for example in German Patent Application No. 102016108247.3, which is hereby incorporated herein by reference in its entirety for all purposes. The optical elements can have uncoupling structures at certain locations of the optical elements, and an optical film, for example an extrusion film, and a molded coating can be applied as described in German Patent Application No. 102011103200, which is hereby incorporated herein by reference in its entirety for all purposes. A coating to spectrally and stress control is described in U.S. patent application Ser. No. 15/124,310, which is hereby incorporated herein by reference in its entirety for all purposes. Different filters can be integrated into the optical elements such as for example gray filters or polarization filters, described in U.S. patent application Ser. No. 14/809,509, filed on Jul. 27, 2015 and published as U.S. Patent Application Publication No. 2016/0096487, for APPARATUS FOR LIGHT INTENSITY ADruSTMENT, which is hereby incorporated herein by reference in its entirety for all purposes.

Electrochromic substrates, polymer electrolytes and other charge conducting medias may be used for the optical elements based on the descriptions of European Patent Application No. 08103179.1, filed on Mar. 31, 2008 for PROCESS FOR PRODUCING ELECTROCHROMIC SUBSTRATES AND ELECTROCHROMIC ARTICLES MADE THEREFROM, European Patent No. 2202826, filed on Dec. 23, 2008 for POLYMER ELECTROLYTES AND DEVICES CONTAINING, U.S. Pat. No. 7,999,992, filed on Jan. 7, 2005 for CHARGE CONDUCTING MEDIUM and U.S. Pat. No. 8,537,451, filed on Mar. 26, 2008 for PROCESSES FOR PRODUCING ELECTROCHROMIC SUBSTRATES AND ELECTROCHROMIC ARTICLES MADE THEREFROM, each of which is hereby incorporated herein by reference in its entirety for all purposes.

The camera module can also be equipped with apparatuses for light intensity adjustment as described for example in U.S. patent application Ser. No. 14/809,509 and light level intensifier tubes as described in U.S. patent application Ser. No. 09/771,140, each of which is hereby incorporated herein by reference in its entirety for all purposes. The electrochromic substrates and devices used in European Patent Application No. 08103179.1, European Patent No. 2202826, U.S. Pat. Nos. 7,999,992, and 8,537,451, each of which is hereby incorporated herein by reference in its entirety for all purposes, can also be used for this purpose as well as a transflector to transmit or reflect light based on a corresponding input signal, as described in German Patent Application No. 102016106126.3, filed on Apr. 4, 2016 for IMAGING SYSTEM, which is hereby incorporated herein by reference in its entirety for all purposes.

The camera module or a cover adapted to the camera module can be moved using different actuators, drives and/or a flexible track, as for example described in German Patent Application No. 102016108247.3 and U.S. patent application Ser. No. 15/281,780, filed on Sep. 30, 2016 for TELESCOPING REARVIEW ASSEMBLY WITH CAMERA AND LENS WIPING SYSTEM, each of which is hereby incorporated herein by reference in its entirety for all purposes.

Still further, the camera module can also include cleaning elements to clean the optical element facing outwards and being exposed to the environment. The cleaning element can for example include wipers, brushes, lips, nozzles, fans and similar elements as are described in European Patent Application No. 14165197.6, filed on Apr. 17, 2014 for OPTICAL SYSTEM FOR A VEHICLE, CLEANING DEVICE AND VEHICLE COMPRISING AN OPTICAL SYSTEM, U.S. patent application Ser. No. 15/281,780, filed on Sep. 30, 2016 for TELESCOPING REARVIEW ASSEMBLY WITH CAMERA AND LENS WIPING SYSTEM, German Patent Application No. 102016108247.3, European Patent Application No. 13163677.1, filed on Apr. 15, 2013 for LENS WIPER, European Patent Application No. 15173201.3, filed on Jun. 22, 2015 for LENS CLEANING WITH FLEXIBLE ACTUATOR and European Patent No. 1673260, filed on Oct. 14, 2003 for CLEANING DEVICE, each of which is hereby incorporated herein by reference in its entirety for all purposes. The cleaning devices are not limited in composition, and may for example include any fabric, elastomeric, sponge, brush, or combination of these. Special wiper elements including wiper arms, wiper blades, wiping cloth, wiping tissue and combinations thereof are described in European Patent Application No. 14165197. 6, which is hereby incorporated herein by reference in its entirety for all purposes. A wiper element may for example be controlled according to the method described in European Patent Application No. 130164250.6, filed on Apr. 18, 2013 for METHOD FOR CONTROLLING A WIPER DEVICE, which is hereby incorporated herein by reference in its entirety for all purposes. A reservoir for holding a cleaning liquid as described in European Patent Application No. 14165197.6, which is hereby incorporated herein by reference in its entirety for all purposes. Such a reservoir can be attached to or integrated into the camera module to provide the cleaning liquid to the optical elements of the camera module.

Different methods may be used to detect dirt or other obscurations preventing or reducing the functioning of the camera module, such as described in U.S. Pat. No. 8,395,514, filed on Jun. 24, 2008 for OPTICAL SYSTEM AND METHOD FOR DETECTING OPTICAL SYSTEM OBSCURATION IN A VEHICLE, European Patent No. 1328141, filed on January 12, for ASSEMBLY HAVING A CONDUCTOR FROM FLEXIBLE MATERIAL AND METHOD FOR MANUFACTURING SUCH AN ASSEMBLY, and U.S. Pat. No. 8,031,224, filed on Sep. 9, 2014 for CAMERA SYSTEM, METHOD FOR OPERATION OF A CAMERA SYSTEM AND SENSOR DEVICE OF A CAMERA SYSTEM, each of which is hereby incorporated herein by reference in its entirety for all purposes.

Also, light sources can be installed or integrated into the camera module to increase the visibility of surrounding objects, measure distances and directions and detect dirt, such as described in U.S. Pat. No. 8,031,224, filed on Sep. 9, 2014 for CAMERA SYSTEM, METHOD FOR OPERATION OF A CAMERA SYSTEM AND SENSOR DEVICE OF A CAMERA SYSTEM, U.S. Patent Application No. 62/470,658, filed on Mar. 13, 2017, 2016 for LIGHT EMITTING MIRROR BEZEL and U.S. patent application Ser. No. 09/771,140, filed on Jan. 26, 2001 for MONITORING DEVICE FOR VEHICLES, IN PARTICULAR, MOTOR VEHICLES, each of which is hereby incorporated herein by reference in its entirety for all purposes.

Different heating means, like heating coils, heating devices integrated into the lens holder or the bezel, or other heating elements can be used to impede condensation and icing at the surface of optical elements, as for example described in German Patent Application No. 102016108247.3, U.S. Patent Application No. 62/470,658, and German Patent Application No. 102016107545.0, filed on Apr. 22, 2016 for HEATING DEVICE FOR A CAMERA LENS, each of which is hereby incorporated herein by reference in its entirety for all purposes.

A watertight seal against weather effects, as well as against the influence of washing processes with detergents, solvents and high pressure cleaners can be used on the housing of the camera module as described in U.S. patent application Ser. No. 13/090,127, which is hereby incorporated herein by reference in its entirety for all purposes.

In another example, the housing can be made of a body including plastic and conductive material, wherein the conductive material is dispersed in the plastic material to form a conductive mass to allow a power source, preferably a DC voltage source, to connect via at least two electrodes to the body and heat the body accordingly, as described in German Patent Application No. 102016107545.0, which is hereby incorporated herein by reference in its entirety for all purposes.

A conductor track can be embedded within plastic parts of the camera module as described in European Patent No. 1328141 and U.S. Pat. No. 7,083,311, filed on Jan. 12, 2002 for CONDUCTOR OF FLEXIBLE MATERIAL, COMPONENT COMPRISING SUCH FLEXIBLE CONDUCTOR, AND METHOD OF MANUFACTURING SUCH CONDUCTOR, each of which is hereby incorporated herein by reference in its entirety for all purposes.

The camera module may include a power harvesting system as described for example in European Patent Application No. 09171683.7, filed on Sep. 29, 2009 for SELF SUSTAINING REAR VIEW MIRROR, which is hereby incorporated herein by reference in its entirety for all purposes.

A fault detection system for electric consumers as described in U.S. Pat. No. 8,487,633, filed on Jan. 14, 2010 for FAULT DETECTION OF ELECTRIC CONSUMERS IN MOTOR VEHICLES, which is hereby incorporated herein by reference in its entirety for all purposes, can be used to detect failure of the camera module.

Different types of fixings can be used to fix the camera module to the vehicle or other components, such as for example the snap-fit connection described in European Patent No. 2233360, filed on Mar. 27, 2009 for SNAP FIT CONNECTION IN A REAR VIEW MIRROR, which is hereby incorporated herein by reference in its entirety for all purposes.

Different control means and analyzing devices can be used, such as the computation units described in U.S. patent application Ser. No. 13/090,127, German Patent Application No. 102016106126.3, German Patent Application No. 102011053999, European Patent No. 2146325, filed on July 16, for RECORDING DEVICE FOR RECEIVING, PROCESSING AND STORING IMAGE FILES IN A VEHICLE AND METHOD, and U.S. Pat. No. 8,849,104, filed on Jul. 16, 2008 for RECORDING DEVICE AND METHOD FOR CAPTURING AND PROCESSING IMAGE DATA IN A VEHICLE, each of which is hereby incorporated herein by reference in its entirety for all purposes. In addition, HDR (high dynamical range) technology can be used according to U.S. patent application Ser. No. 14/830,406, filed on Aug. 19, 2015 for REAR VIEW DEVICE FOR A MOTOR and published as US 2015/0358590, which is hereby incorporated herein by reference in its entirety for all purposes.

Further advantageous embodiments of the invention are explained with the help of the following examples.

Example 1

An antenna housing (160) for mounting on a vehicle (10), in particular on a vehicle roof surface (20), and being adapted to house
    an electrical circuit (140) including at least one source element (142) for emitting luminescent radiation, the at least one source element (142) being located internally within the housing (160) so as not to be visible externally;
    an indicating element (152) for releasing luminescent radiation received from the at least one source element (142) for viewing externally; and
    an optical conduit (154) for providing an optical couple between the at least one source element (142) and the indicating element (152).

Example 2

The antenna housing (160) of example 1, further comprising an electrical circuit receiving recess (131) configured to receive or support the electrical circuit (140).

Example 3

The antenna housing (160) of example 1 or 2, further comprising a vehicle roof surface engaging portion (164), in particular disposed around the electrical circuit receiving recess (131).

Example 4

The antenna housing (160) of example 2 or 3 mounted on a vehicle roof surface (20) such that the recess (131) projects into a corresponding recess or aperture within the vehicle roof surface (20).

Example 5

The antenna housing (160) of any one of the preceding examples, wherein the housing (160) includes a window (161) for releasing luminescent radiation, with the window (161) preferably being positioned adjacent to the indicator element.

Example 6

The antenna housing (160) of example 5, wherein the window (161) allows light transmission of between 5-75%, preferably between 10-75%.

Example 7

The antenna housing (160) of one of the preceding examples, wherein the housing (160) comprises an opaque inner layer (162) and a tinted outer layer (163), with the opaque inner layer (162) preferably including the window (161).

Example 8

The antenna housing (160) of one of the preceding examples, wherein the indicating element (152) and the optical conduit (154) form part of a light guide (150), the light guide (150) preferably having a unitary body.

Example 9

The antenna housing (160) of one of the preceding examples, wherein the optical conduit (154) has a plurality of legs (155), preferably each of the legs (155) being associated with one source element (142).

Example 10

A combined antenna and indicator module (100) for mounting on a vehicle (10), in particular on a vehicle roof surface (20), including the antenna housing (160) of one of the preceding examples, and at least one antenna element or antenna module (110) supported by or within the housing (160).

Example 11

The module (100) of example 10, wherein the electrical circuit (140) is shielded to prevent or reduce electromagnetic interference with the, or each, antenna element or module (110), with preferably the optical conduit (154) and/or the light guide (150) being positioned adjacent the antenna element or antenna module (110).

Example 12

The module (100) of one of examples 10 or 11, wherein the, or each antenna element has a projected pattern (111) for receiving or transmitting radio transmissions.

Example 13

The module (100) of example 12, wherein at last part of the indicating element (152) and/or at least part of the optical conduit (154) is/are positioned within the projected pattern (111) of the, or each, antenna element.

Example 14

The module (100) of one of examples 12 or 13, wherein the electrical circuit (140) is positioned outside of the projected pattern (111) of the, or each, antenna element.

Example 15

The module (100) of one of examples 10 or 14, further comprising a lighting module (120), which comprises a cover element (130) through which protrudes the light emitting surface (153) and the electrical circuit (140).

Example 16

The module (100) of one of examples 10 or 15, wherein the indicating element (152) features discrete optics (157), in particular in the form of a plurality of angled surfaces, which direct light toward the light emitting surface (153).

Example 17

The module (100) of one of examples 10 or 16, further comprising at least one reflector element (171, 172), with preferably a first reflector element (171) being positioned at a bend in the light guide (150) and/or a second reflector element (172) being positioned under the indicating element (152), in particular under the optics (157) of the indicating element (152).

Example 18

A vehicle (10) with at least one antenna and indicator module (100) of one of the examples 10 to 14, preferably attached or attachable to a roof surface (20) of the vehicle.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims. Please note that the following claims are provisional claims only, and are provided as examples of possible claims and are not intended to limit the scope of what may be claimed in any future patent applications based on the present application. Integers may be added to or omitted from the example claims at a later date so as to further define or re-define the invention.

REFERENCE SIGNS LIST 10 vehicle
20 roof surface
22 back panel
24 web
26 web
28 recess
30 installation space
40 light pipe
42 incoupling area
44 lens system
46 reflection area
48 outcoupling area
50 lamp unit
60 lens
62 lens system
100 combined antenna and indicator module
110 antenna module
111 radiation pattern
120 lighting module
130 cover element
131 receiving recess
140 electrical circuit
141 printed circuit board (PCB)
142 source element, light emitting diode (LEDs)
150 light guide
152 indicating element
153 emitting surface
154 optical conduit
155 legs
156 light receiving surface
157 angled surfaces, optics
160 antenna housing
161 window
162 opaque inner layer
163 tinted outer layer
164 engaging portion
171, 172 reflector element
200 housing
250 lamp unit 280 recess
300 installation space
400 light pipe
420 incoupling area
460 total reflection area
480 outcoupling area
600 clear lens
700 light rays
710 light rays
720 light rays
1336 clear lens
1340 coating

What is claimed is:

1. An antenna housing for mounting on a vehicle or on a vehicle roof surface, comprising:
    an electrical circuit including at least one source element for emitting luminescent radiation, the at least one source element being located internally within the housing so as not to be visible externally;
    an indicating element for releasing luminescent radiation received from the at least one source element for viewing externally; and
    an optical conduit for providing an optical couple between the at least one source element and the indicating element,
    wherein the optical conduit has a plurality of legs, each of the legs being associated with one source element.

2. The antenna housing as claimed in claim 1, further comprising an electrical circuit receiving recess configured to receive or support the electrical circuit.

3. The antenna housing as claimed in claim 2, wherein the antenna housing is mounted on a vehicle roof surface such that the recess projects into a corresponding recess or aperture within the vehicle roof surface.

4. The antenna housing as claimed in claim 1, further comprising a vehicle roof surface engaging portion disposed around the electrical circuit receiving recess.

5. The antenna housing as claimed in claim 1, wherein the housing includes a window for releasing luminescent radiation with the window being positioned adjacent to the indicator element.

6. The antenna housing as claimed in claim 5 wherein the window allows light transmission of between 5-75% or between 10-75%.

7. The antenna housing as claimed in claim 1, wherein the housing comprises an opaque inner layer and a tinted outer layer with the opaque inner layer including the window.

8. The antenna housing as claimed in claim 1, wherein the indicating element and the optical conduit form part of a light guide, or the light guide has a unitary body.

9. The antenna housing as claimed in claim 1, wherein one or more of the housing, the source element, the indicating element, the optical conduit, the window, the legs, and the light guide form at least partly at least one lamp unit, wherein the source element forms at least partly at least one light source and/or the indicating element, the optical conduit, the legs and/or the light guide form at least partly at least one light pipe.

10. The antenna housing according to claim 9, wherein at least one a clear lens, partly formed by the window, encloses at least partly or substantially the housing, the at least one light pipe, the indicating element, the optical conduit, the legs or the light guide, and/or the at least one light source, the lens having an inner surface, an outer surface disposed opposite the inner surface and a continuous transparent and/or translucent coating on the outer surface, wherein when the at least one light source emits light, the continuous transparent and/or translucent coating is at least partially permeable to at least some light which is emitted by the at least one light source and passed through the lens, and
    wherein the at least one light pipe is provided with an inside coating and/or an outside coating and/or faded marks.

11. The antenna housing according to claim 10, wherein the coating is located on selective locations of the light pipe, optionally in different thicknesses.

12. The antenna housing according to claim 10, wherein the coating is a hardcoating selected from the group consisting of an organo-silicon, an acrylic, a urethane, melamine, and a $SiO_xC_yH_z$.

13. The antenna housing according to claim 10, wherein the coating has a different refractive index compared to the refractive index of the material of the light pipe, the indicating element, the optical conduit, the legs and/or the light guide.

14. The antenna housing according to claim 10, wherein the faded marks are selected from the group consisting of etches, tints, dyings, additives, reflecting materials, scattering materials, or optics moulded into the light pipe.

15. The antenna housing according to claim 10, wherein the faded marks are introduced into the at least one light pipe by choosing at least one additive for the respective plastic.

16. The antenna housing according to claim 10, wherein the light pipe, the indicating element, the optical conduit, the legs and/or the light guide is coated at selective locations.

17. The antenna housing according to claim 10, wherein the lamp unit is produced out of plastic in a three-component injection procedure, and
    wherein the refractive index of the plastic of the clear lens is selected to be different from the refractive index of the plastic of the light pipe, the indicating element, the optical conduit, the legs and/or the light guide, the boundary between the clear lens and the at least one light pipe, the indicating element, the optical conduit, the legs and/or the light guide, adjacent to it is at least partly formed with a structure.

18. The antenna housing according to claim 10, further comprising at least one light foil.

19. The antenna housing according to claim 18, wherein the light foil is arranged at least partly between the clear lens and at least a part of the at least one light pipe, the indicating element, the optical conduit, the legs and/or the light guide.

20. The antenna housing according to claim 18, wherein the light foil is extending along at least a part of the clear lens.

21. The antenna housing of claim 18, wherein the light source and the light foil fulfil different light functions, at least one of a turn light indicator, a puddle light, a logo light and an approach light.

22. The antenna housing of claim 18, further comprising at least two source elements and/or light sources fulfilling different light functions including at least one of a turn light indicator, a puddle light, a logo light and an approach light.

23. The antenna housing according to claim 10, wherein the light pipe, the indicating element, the optical conduit, the legs and/or the light guide is enclosed by the housing and the clear lens.

24. The antenna housing according to claim 10, wherein the light rays from at least one first light source are subjected to a total reflection at the boundary between the light pipe, the indicating element, the optical conduit, the legs and/or the light guide on one hand, and the clear lens on the other side, outside at least one light decoupling area.

25. The antenna housing of claim 24, further comprising a plurality of light decoupling regions provided by at least one of the clear lens and the housing.

26. The antenna housing of claim 24, wherein there is a plurality of at least one of light decoupling directions and light decoupling ranges.

27. The antenna housing of claim 24, further comprising a plurality of light decoupling regions, with light having different characteristics being decoupled from the different decoupling regions.

28. The antenna housing according to claim 10, wherein the light rays from a second light source are decoupled along at least a part of the extent of the light pipe, the indicating element, the optical conduit, the legs and/or the light guide.

29. The antenna housing of claim 28, wherein the light rays decoupled from the light pipe, the indicating element, the optical conduit, the legs and/or the light guide pass at least one of the light foil, the clear lens and the housing.

30. The antenna housing of claim 28, wherein the light rays decoupled from the light pipe, the indicating element, the optical conduit, the legs and/or the light guide pass an opening in at least one of the light foil and the housing.

31. The antenna housing of claim 10, wherein the clear lens is made out of a polymeric substrate,
wherein the polymeric substrate is coated with a chromium-based reflective coating, and
wherein the polymeric substrate and the chromium-based reflective coating are at least in part permeable to light originating from at least one of the light foil and the at least one light source.

32. The antenna housing of claim 31, wherein the coating is an alloy of chromium and a dopant material, the dopant material being selected from the hexagonally close-packed transition metals, the alloy having a crystal structure of a primary body-centered cubic phase in coexistence with a secondary omega hexagonally close-packed phase.

33. The antenna housing of claim 32, wherein the alloy is a binary alloy of chromium and the dopant material.

34. The antenna housing of claim 32, wherein the atomic percentage of the dopant material in the binary alloy is in the range of from about 1.9 at. % to about 5.8 at. %.

35. The antenna housing of claim 32, wherein the atomic percentage of the dopant material in the binary alloy is in the range of from about 1.9 at. % to about 5.8 at. %.

36. The antenna housing of claim 32, wherein the dopant material is selected from the hexagonally close-packed transition metals zirconium, titanium, cobalt, hafnium, rubidium, yttrium and osmium.

37. The antenna housing of claim 32, wherein the dopant material is selected from the hexagonally close-packed transition metals zirconium, titanium and cobalt.

38. The antenna housing of claim 32, wherein the dopant material is selected from the hexagonally close-packed transition metals zirconium, titanium and cobalt.

39. The antenna housing of claim 32, wherein the alloy is a binary alloy and the dopant material is zirconium, and wherein the atomic percentage of the zirconium in the binary alloy is in the range of from about 4.5 at. % to about 5.8 at. %.

40. The antenna housing of claim 32, wherein the alloy is a binary alloy and the dopant material is titanium, and wherein the atomic percentage of the titanium in the binary alloy is in the range of from about 1.9 at. % to about 5.8 at. %.

41. The antenna housing of claim 32, wherein the alloy is a binary alloy and the dopant material is cobalt, and wherein the atomic percentage of the cobalt in the binary alloy is in the range of from about 1.9 at. % to 5.7 at. %.

42. The antenna housing of claim 32, wherein the polymeric substrate is formed from a material selected from the group consisting of polyacrylate, polyester, polystyrene, polyethylene, polypropylene, polyamides, polyamides, polycarbonate, epoxy, phenolic, acrylonitrile-butadiene-styrene, acrylonitrile-styrene-acrylates, acetal and blends of these.

43. The antenna housing of claim 31, wherein the polymeric substrate is formed from a material selected from the group consisting of polycarbonate, poly(2,2'-dihydroxyphenylpropane) carbonate, polydiethyleneglycol bis(allyl carbonate), polymethylmethacrylate and polystyrene, or blends thereof.

44. The antenna housing of claim 31, wherein the polymeric substrate includes a pre-coated film in the form of either a hardcoat, an inorganic oxide, or a thin metal film, or a combination of such pre-coated films.

45. The antenna housing of claim 10, wherein the coating has a thickness of 200 nm, 100 nm, ranging from 40 nm to 80 nm, ranging from 50 nm to 70 nm, or about 60 nm.

46. The antenna housing of claim 9, wherein two or more light pipes are present at the same location,
wherein at least one light pipe can be seen from the outside, and
wherein one or more of the other light pipes is coated with a chromium-based reflective coating.

47. A combined antenna and indicator module for mounting on a vehicle or a vehicle roof surface, comprising
the antenna housing of claim 1; and
at least one antenna element or antenna module supported by or within the housing.

48. The module as claimed in claim 47, wherein the electrical circuit is shielded to prevent or reduce electromagnetic interference with the, or each, antenna element or module, with the optical conduit and/or the light guide being positioned adjacent the antenna element or antenna module.

49. The module as claimed in claim 47, wherein each antenna element has a projected pattern for receiving or transmitting radio transmissions.

50. The module as claimed in claim 49, wherein at last part of the indicating element and/or at least part of the optical conduit is/are positioned within the projected pattern of the, or each, antenna element.

51. The module as claimed in claim 49, wherein the electrical circuit is positioned outside of the projected pattern of each antenna element.

52. The module as claimed in claim 47, further comprising a lighting module, which comprises a cover element through which protrudes the light emitting surface and the electrical circuit.

53. The module as claimed in claim 47, wherein the indicating element features discrete optics, in the form of a plurality of angled surfaces, which direct light toward the light emitting surface.

54. The module as claimed claim 47, further comprising at least one reflector element, with a first reflector element being positioned at a bend in the light guide and/or a second reflector element being positioned under the indicating element, under the optics of the indicating element.

55. The module of claim 47, further comprising at least one control unit connected to the light source, at least one light foil and/or the vehicle.

56. A vehicle with the antenna and indicator module of claim 47, the module being attached or attachable to a roof surface of the vehicle.

\* \* \* \* \*